Figures 1, 2:
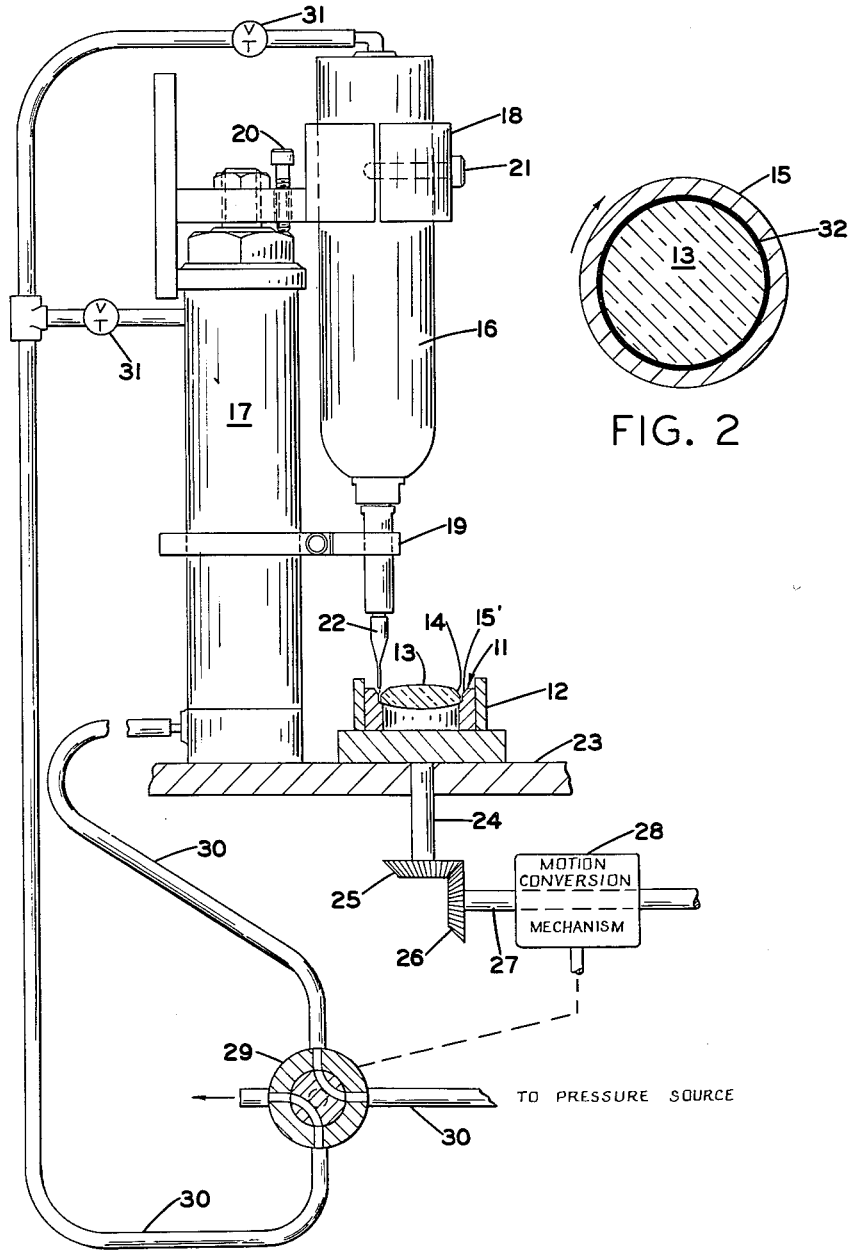

Nov. 20, 1962 D. MORREALLE ET AL 3,064,717
APPARATUS FOR LENS MOUNTING
Filed March 30, 1961

INVENTORS
DOMINICK MORREALLE
JOHN H. WALDOCK
BY Frank C. Parker
David E. Dougherty
ATTORNEYS

United States Patent Office 3,064,717
Patented Nov. 20, 1962

3,064,717
APPARATUS FOR LENS MOUNTING
Dominick Morrealle, Irondequoit, and John H. Waldock, Rochester, N.Y., assignors to Bausch & Lomb Incorporated, Rochester, N.Y., a corporation of New York
Filed Mar. 30, 1961, Ser. No. 99,492
1 Claim. (Cl. 156—575)

This invention relates to apparatus for mounting lenses and more particularly to apparatus for applying a uniform bead of adhesive to the area between a lens and a mounting member.

In mounting lenses it is desirable to cement the lens in a mounting member with a uniform bead of adhesive. The bead of adhesive should be applied to the peripheral edge of the lens and confined to a predetermined area. The process of applying the cement may be carried out by the apparatus described herein. The apparatus is such that an accurately controlled amount of sealing compound or adhesive may be applied to a preselected area without flowing onto an adjacent area.

Advantageously the present invention provides apparatus for mounting a lens in a mounting member or ring in superimposed relation to thereby form an integral structure. The apparatus for mounting lenses in accordance with the present invention allows a uniform film or bead of adhesive to be applied to a selected area in a manner that minimizes the probability of the adhesive flowing onto the adjacent area.

The use of the present invention provides an apparatus for mounting lenses wherein the parts of a lens assembly i.e., the lens and the lens mounting member may be secured together at their peripheral edges to prevent the entrance of dirt, dust, moisture etc. and held in proper relation with each other. This result is accomplished by extruding a bead of sealing compound into a peripheral groove. The use of extrusion facilitates completion of a sealing ring and minimizes the probability of applying sealing compound to the adjacent areas.

Briefly the invention comprises apparatus for mounting a lens in an annular mounting member or ring. A lens having a chamfered edge is arranged in superimposed contiguous relation with a mounting member which has a chamfered inner edge or seat, to thereby form a peripheral groove. The resulting lens assembly is rotated and a bead of sealing compound is extruded into the groove to thereby form a seal. The apparatus includes means for rotating the lens assembly and means to extrude a bead of sealing compound into the groove between the lens and lens mounting member. Means are also provided to bring the extrusion die into close proximity to the peripheral groove to thereby reduce the probability of extruding sealing compound onto the area adjacent the groove.

FIG. 1 is a side elevational view illustrating a device made in accordance with the present invention; and FIG. 2 is a top plan view of a lens and lens mounting ring.

In the apparatus shown a lens assembly 11 is held in a rotary chuck 12. The lens assembly 11 comprises a lens 13 having a chamfered edge 14 and a mounting ring 15. The mounting ring 15 has a chamfered edge or seat 15' arranged to receive the lens 13. The chamfered edges may be formed by grinding. The lens 13 is placed in superimposed contiguous relation with the mounting ring 15 to thereby form a peripheral V-shaped groove having its apex at the line of contact between the lens 13 and mounting ring 15.

A cement supply tube 16 is adjustably mounted above the rotary chuck 12. The supply tube 16 is vertically reciprocable by being mounted on a pneumatic cylinder 17 by brackets 18 and 19. The brackets 18 and 19 are arranged so that the supply tube may be vertically and angularly adjusted by adjusting screws 20 and 21.

The supply tube 16 carries a hypodermic needle 22 which acts as an extrusion die. The needle 22 is arranged so that when pressure is applied to the top of the supply tube 16, a thin bead of sealing compound 32 will be extruded thru the small orifice in the hypodermic needle 22.

A base plate 23 has the pneumatic cylinder 17 and the rotary chuck 12 mounted thereon. The rotary chuck 12 is rotated by a shaft 24, which is journaled into the base 23. The lower end of the shaft 24 carries a beveled pinion 25 which meshes with a second beveled pinion 26. The second beveled pinion 26 is secured to a drive shaft 27 which is driven thru the motion conversion mechanism 28 by a motor (not shown).

The motion conversion mechanism is arranged in conjunction with control means (not shown) to provide intermittent drive to the valve 29 which is connected by air lines 30 to a pressure source (not shown), the pneumatic cylinder 17 and the supply tube 16. Pressure regulators 31 may be placed in the lines 30 in order to regulate the pressure supplied to the supply tube 16 and the pneumatic cylinder 17. The regulators 31 may be adjusted to require a relatively low pressure to lower the supply tube 16 and a relatively high pressure to extrude the cement.

In operation the lens 13 and the mounting ring 15 are inserted in the chuck 12 and are rotated by means of the drive arrangement. The needle 22 is brought into close proximity to the V-shaped peripheral groove formed by the chamfers 14 and 15' by the pneumatic cylinder 17, and sealing compound is extruded through the needle 22 in a uniform bead to fill the V-shaped groove as the lens assembly 11 is rotated. The lens assembly can be rotated at different speeds or the cement flow can be varied in order to control the amount of cement used to effect a seal.

The motion conversion mechanism is arranged to actuate the valve 29 to stop the extrusion of adhesive and to raise the needle out of proximity with the lens assembly 11 when a sealing ring has been completed. This arrangement insures the proper filling of the groove and minimizes the probability of the adhesive flowing onto the areas adjacent the groove.

To start a cycle a lens assembly is placed in the rotary chuck and the valve 29 is manually actuated. The valve redirects the pressure in the pneumatic cylinder and allows the needle to be brought into close proximity i.e., approximately $1/32$ inch, to the V-shaped groove. The presure is applied to the supply tube 16, to thereby extrude a bead of compound into the V-shaped groove as the lens assembly 11 is rotated. When the sealing ring is completed the extrusion is stopped and the needle raised to allow the sealed assembly to be removed and a second cycle to be commenced.

What is claimed is:

Apparatus for mounting a lens in an annular mounting member to form a lens assembly defining a V-shaped peripheral groove between the lens and the mounting member comprising a rotary chuck adapted to receive the lens assembly, a source of pressurized fluid, valve means in communication with said source, control means rotating said chuck and simultaneously operating said valve means, a substantially vertical reciprocable supply tube disposed above said rotary chuck and having a supply of cement therein, a hollow needle mounted on said supply tube, means adjusting the vertical distance between said needle and said rotary chuck, and a reciprocable fluid operated cylinder means supporting and reciprocating said supply tube, conduit means connecting said cylinder means and said supply tube through said valve means to said source of pressurized fluid, pressure regulator means associated with said cylinder means and said supply tube requiring a relatively small pressure to reciprocate said supply tube and for positioning said needle in close proximity to the V-shaped groove, said pressure regulator means requiring a relatively large pressure to extrude the cement whereby said cylinder means reciprocates said tube and said needle for positioning said needle in and out of close proximity to the V-shaped groove in response to the flow of pressurized fluid through said valve means as said control means is operated.

References Cited in the file of this patent
UNITED STATES PATENTS
2,976,200    Stover _____ Mar. 21, 1961